US008862548B2

(12) United States Patent
MacDonell et al.

(10) Patent No.: US 8,862,548 B2
(45) Date of Patent: Oct. 14, 2014

(54) FILE SYSTEM CLONING BETWEEN A TARGET DEVICE AND A HOST DEVICE

(75) Inventors: Eoin MacDonell, Sunnyvale, CA (US); Andreas Wendker, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 622 days.

(21) Appl. No.: 12/397,600

(22) Filed: Mar. 4, 2009

(65) Prior Publication Data

US 2009/0228495 A1 Sep. 10, 2009

Related U.S. Application Data

(60) Provisional application No. 61/033,752, filed on Mar. 4, 2008.

(51) Int. Cl.
*G06F 7/00* (2006.01)
*G06F 17/00* (2006.01)
*G06F 9/445* (2006.01)

(52) U.S. Cl.
CPC ........... *G06F 8/63* (2013.01); *Y10S 707/99954* (2013.01); *Y10S 707/99955* (2013.01)
USPC ........... 707/640; 707/610; 707/649; 707/653; 707/659; 707/999.203; 707/999.204

(58) Field of Classification Search
CPC .................... G06F 17/30067; G06F 17/30528
See application file for complete search history.

(56) References Cited

U.S. PATENT DOCUMENTS

| 7,350,214 | B2* | 3/2008 | Williams et al. | 719/317 |
|---|---|---|---|---|
| 2003/0088650 | A1* | 5/2003 | Fassold et al. | 709/220 |
| 2004/0078692 | A1* | 4/2004 | Jackson et al. | 714/38 |
| 2004/0267697 | A1* | 12/2004 | Hamidi | 707/1 |
| 2005/0027831 | A1* | 2/2005 | Anderson et al. | 709/220 |
| 2006/0080659 | A1* | 4/2006 | Ganji | 717/178 |
| 2007/0185921 | A1* | 8/2007 | Prahlad et al. | 707/201 |
| 2007/0284443 | A1* | 12/2007 | Anson et al. | 235/435 |
| 2007/0288551 | A1* | 12/2007 | Sidon | 709/203 |
| 2008/0052706 | A1* | 2/2008 | Isaacson | 717/174 |
| 2008/0077634 | A1* | 3/2008 | Quakenbush | 707/204 |
| 2008/0134045 | A1* | 6/2008 | Fridman et al. | 715/735 |
| 2009/0037515 | A1* | 2/2009 | Zapata et al. | 709/202 |
| 2010/0125735 | A1* | 5/2010 | Zapata et al. | 713/170 |

* cited by examiner

*Primary Examiner* — Azam Cheema
(74) *Attorney, Agent, or Firm* — Blakely, Sokoloff, Taylor & Zafman LLP (57) ABSTRACT

Systems and methods of configuring electronic devices can include installing a first operating configuration on a first target device, running at least a first operational iteration of the first target device, saving at least a portion of a first file system resulting from the running of the at least first operational iteration of the first target device, and creating a first clone of the at least portion of the first file system at a separate host device. The first clone can be substantially identical to the corresponding at least portion of the first file system. The first clone can be evaluated via the host device. The host device can present the clone data in an integrated development environment such that a user can evaluate the clone data.

7 Claims, 8 Drawing Sheets

FILE SYSTEM CLONING BETWEEN A TARGET DEVICE AND A HOST DEVICE

The present application claims priority to U.S. Provisional Application No. 61/033,752, filed Mar. 4, 2008, and entitled BUILD SYSTEM REDIRECT.

BACKGROUND

1. Field

This disclosure relates to the field of software/hardware development and to systems and methods of cloning files and/or file systems from target devices to a host device. The host device can operate an integrated development environment to facilitate development.

2. Description of the Related Technology

A wide variety of electronic devices exist and are being developed to provide entertainment, productivity, and/or communication services to a user. For example, various versions of electronic devices can support music playback, voice telephony, Internet connectivity, text messaging, and the like. Frequently, electronic devices are provided in a relatively small size and provided with a self-contained independent power source, such as a battery. Such relatively small, self-powered devices are popular because they often provide the additional advantage of portability to the user.

Frequently, users wish to modify or enhance the capabilities and functionality of an electronic device. For example, users may wish to install one or more games on their electronic device to enhance the entertainment capabilities of the device. Modification or customization of an electronic device can include installation of additional or replacement hardware components and/or installation of application software. Frequently, users elect to install customized enhancements, either self-prepared or as provided by a third-party supplier.

Difficulties can arise however with modifying a configuration of an electronic device and obtaining desired performance of the modified configuration. For example, a third-party developed hardware or software plug in may operate differently on different versions of electronic devices. For example, a third-party developer may create a new application in a generic format. Such a generic application may work properly on some electronic devices, however may not function properly or at all when installed in other versions of electronic device. Thus, it will be understood that there is a need for systems and methods of facilitating the creation and development of hardware and/or software modifications such that these modifications can be more readily and efficiently developed to provide the enhanced capabilities to a broader base of users in a more timely manner.

DETAILED DESCRIPTION

Embodiments allow for communicating and/or synchronizing files from a target electronic device to a host device to facilitate analysis of the operation or modification of the target device. In some embodiments, running of a target electronic device can generate one or more files that store data indicative of the operation of the device. A plurality of files can be generated and saved as a file system. Such files or file systems from a target electronic device can be communicated to the host device such that the host device can create and evaluate a clone of the file system of the target electronic device. In some embodiments, a clone of the file system at the host device can be substantially identical to the file/file system resident on the target electronic device.

In some embodiments, a host device can operate an integrated development environment (IDE). In some embodiments, the host device can access the cloned file systems with the IDE to facilitate more rapid and efficient development of device enhancements whose operation resulted in the corresponding file system on the target device.

In addition, an iterative approach can be utilized to facilitate development of enhancement software/hardware for target devices. For example, in one embodiment, a developer can run multiple iterations of a given configuration of the target device, communicate the resulting multiple file systems from the target device to a host device, and evaluate clones of the file systems corresponding to the multiple runs of the target device to evaluate operation of the target device at the host device. In some embodiments, the IDE can save a history of the file systems from multiple runs of an application.

Accordingly, in some embodiments, a developer can perform multiple operational runs of a given configuration of software and/or hardware enhancement on the same and/or different target devices and evaluate associated clones of the resulting processes. In one embodiment, a developer can perform a first operational run of the target device under a first configuration, evaluate the resulting clone of the target device file system, modify the target device to a second configuration, and compare a resulting second clone of the file system as generated under the second configuration to the first clone generated under the first configuration.

Figure 1:
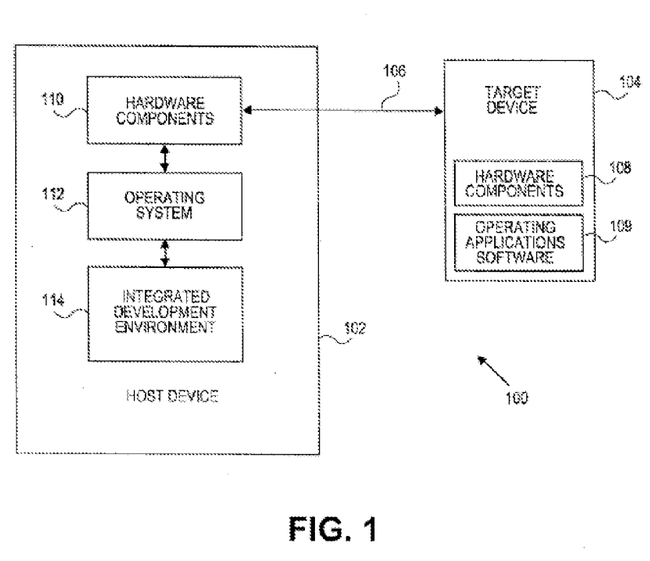
FIG. 1 is a block diagram of one embodiment of a system for file cloning between a target device and a host device.

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described FIG. 1 illustrates one embodiment of a system for file cloning between host device 102 and target device 104. System 100 can provide communication and data synchronization between host device 102 and target device 104, such as via a communication link 106. In this embodiment, communication between host device 102 and target device 104 can be provided directly via communication link 106. In one embodiment, communication link 106 can include a hard wired tethering between host device 102 and target device 104, such as via a universal serial bus (USB) connection. In another embodiment, communication link 106 can include a wireless communication link and can occur over a variety of communication formats as will be understood by one of ordinary skill.

Target device 104 can include any of a variety of devices including but not limited to music players, video players, telephony handsets, Internet connectivity devices, personal digital assistants (PDA), personal computers, and the like. It will be understood that target device 104 can include a plurality of different functionalities. For example, embodiments of target device 104 can include the functionality of a cellular telephony handset, a music player, and a web browsing tool.

In general, target device 104 can include hardware components 108 and operating and applications software 109. The particular variety of hardware components 108 provided in target device 104 can vary depending on the particular needs and uses of target device 104. Hardware components 108 can include one or more of a microprocessor, memory, storage, removable storage readers/drives, a display, user control inputs, microphone, speakers, a camera, and the like. Operating and applications software 109 can also vary depending on the needs and uses of a given type of target device 104, however can generally include one or more of memory management, display drivers, text editors, web browsing software, media players, games, and the like.

Hardware components 108 and operating and applications software 109 of target device 104 can be configured to establish and maintain a bidirectional communication with host device 102 via communications link 106. Hardware components 108 and operating and applications software 109 can be also configured to generate and store data that can be communicated to host device 102 via communications link 106. Additional details of data that can be created and stored by target device 104 and be communicated over communications link 106 will be illustrated and described below.

Host device 102 can include hardware components 110. Hardware components 110 can be similar in structure and function to hardware components 108 of target device 104. However, in at least some embodiments, at least certain of hardware components 110 of host device 102 can provide greater capacity or performance than corresponding hardware components 108 of target device 104. For example, in some embodiments a processor of host device 102 may offer faster processing than a microprocessor of target device 104. Similarly, in some embodiments, memory and/or storage of host device 102 can be of higher capacity than memory and/or storage of target device 104. In some embodiments, hardware components 110 of host device 102 can include capability for providing operating power to host device 102 directly from electrical wall service. In some embodiments, target device 104 can be configured to operate off of rechargeable battery power. Thus, in some embodiments, target device 104 may operate under power consumption constraints that do not apply to host device 102.

Host device 102 also can include operating system 112 configured to provide memory management, user interface functionality, and intra-device communication. Hardware components 110 and operating system 112 can be also configured to support communication with target device 104 via communication link 106.

In one embodiment, host device 102 further can include an integrated development environment (IDE) 114. IDE 114 can include software applications to facilitate development of software. In one embodiment, IDE 114 can include a source code editor, a compiler, automation tools, and a debugger utility. In one embodiment, IDE 114 can include a class browser, an object inspector, and a class hierarchy diagram to facilitate development of object oriented software. IDE 114 can assist a user in creating and developing software by integrating software editing, file management, compiling, debugging, and execution. In one non-limiting embodiment, IDE 114 can be Xcode and operating system 112 can be the Macintosh operating system.

Figure 2:
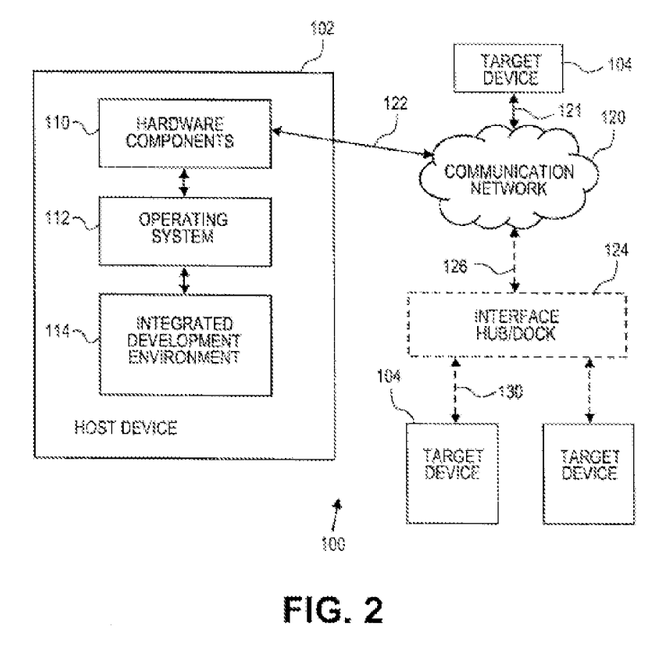
FIG. 2 is a block diagram of another embodiment of a system for file cloning between a host device and a target device via a communication network.

FIG. 2 illustrates another embodiment of system 100 for file sharing between one or more target devices 104 and host device 102. The embodiment of system 100 illustrated in FIG. 2 can be substantially similar in structure and operation to the embodiments of system 100 illustrated with respect to FIG. 1, with the primary difference related to the nature of communication between host device 102 and target devices 104.

As previously described, communication link 106 can provide direct communication between host device 102 and target device 104 in a wireless and/or wired manner. In the embodiments of systems 100 illustrated in FIG. 2, communication between one or more target devices 104 and host device 102 can occur via communication network 120. Communication network 120 can support wired and/or wireless communication between a plurality of devices. In various embodiments, communication network 120 can include a local area network (LAN), a wide area network (WAN), a public network, a private network, the Internet, or any of a variety of other communication network formats known to those of ordinary skill.

In one embodiment, target device 104 can establish first communication link 121 with communication network 120 and host device 102 can establish second communication link 122 with communication network 120. As previously described with respect to communication link 106, communication links 121, 122 can include wired and/or wireless communication links. Thus, in one embodiment, host device 102 can establish communication link with target device 104 via interposed communication network 120.

In one embodiment, system 100 further can include an interface hub/dock 124. Interface hub/dock 124 can be configured to establish communication with communication network 120 via communication link 126. Again, communication link 126 can include a wired or wireless connection. Interface hub/dock 124 can also be configured to establish communication with one or more target devices 104 via communication links 130. In one embodiment, interface hub/dock 124 can be configured to communicate with a plurality of target devices 104 simultaneously.

In one embodiment, interface hub/dock 124 can be provided at a point of sale/service for target devices 104. In one embodiment, target devices 104 and interface hub/dock 124 can be configured to automatically establish communication when target device 104 can be connected to interface hub/dock 124 and/or brought within an appropriate range of interface hub/dock 124. Thus, in one embodiment, target device 104 can automatically establish communication with interface hub/dock 124 and thus with communication network 120 and host device 102 without further user input.

Figure 3:
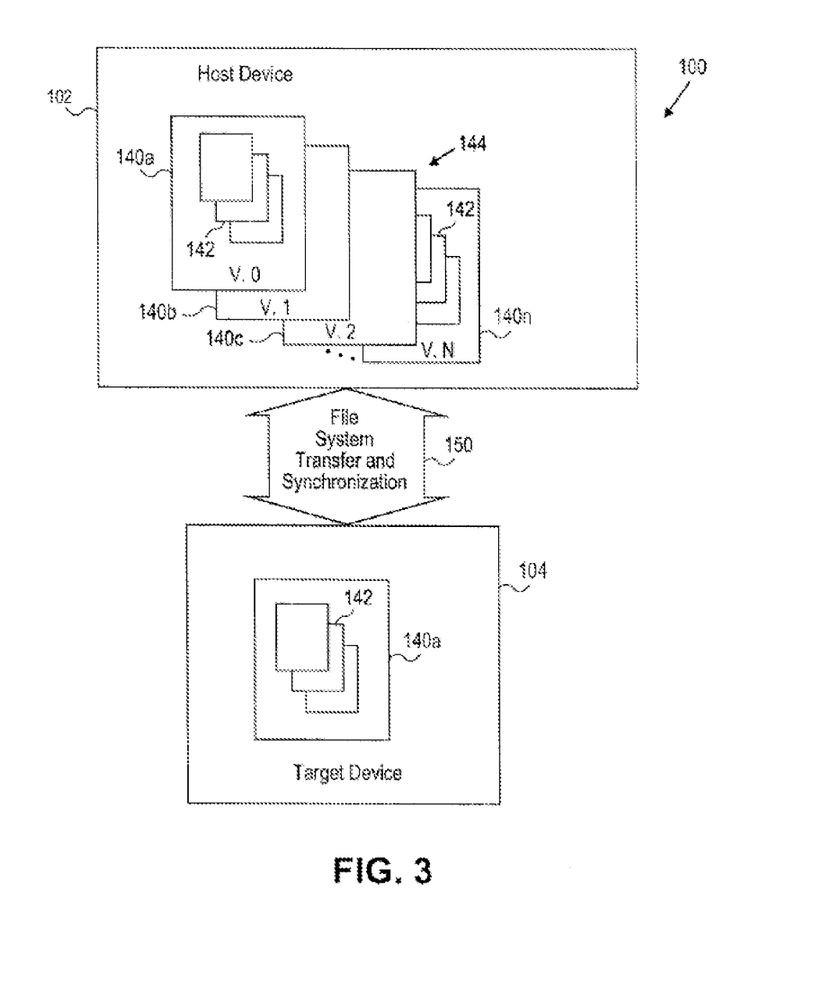
FIG. 3 is a block diagram of embodiments of a system for file system cloning between a host device and a target device.

FIG. 3 illustrates additional details of data storage and handling in system 100 and more particularly between host device 102 and target device 104. As previously described, operating and applications software 109 of target device 104 can include one or more utilities or applications to expand the capabilities and features of target device 104. For example, operating and applications software 109 can include one or more audio media players, photo players, video players, email utilities, text messaging utilities, web browsers, games, instant messaging utilities, telephony applications, and the like.

In at least some embodiments, an operational iteration or "run" of at least some applications or utilities of target device 104 can generate corresponding data that can be saved by target device 104. In one embodiment, this data resulting from operational iterations of target device 104 can be stored in a file system indicated by designator 140a. In one embodiment, file system 140 can include a plurality of files or documents 142 arranged in a file system architecture.

It will be appreciated that a wide variety of particular configurations or formats of file system 140 and files or documents 142 within file system 140 can be created and stored by device 104. The particular format or configuration of file system 140 and files 142 can depend on the particular version of target device 104 and the particular configuration of installed hardware components 108 and/or operating and applications software 109. Thus, any particular content, configuration, format, or structure of a particular file system 140 and/or files 142 does not limit the scope of the invention.

In at least some embodiments, data stored within file system 140 can be indicative of the operational performance of target device 104. For example, contents of file system 140 may indicate successful and unsuccessful transfer attempts, for example of media files and/or text messages to/from target device 104. In some embodiments, file system 140 may contain error messages, screen shots, memory usage data, processor usage data, and the like.

As previously noted, a wide variety of applications and utilities can be available and constantly being developed for use in target devices 104. Similarly, a user can install an upgrade or expansion to hardware components 108. With a wide variety of possible configurations and combinations of hardware components 108 and operating and applications software 109 and the different versions or types of target devices 104 themselves, numerous opportunities occur for possible conflicts or incompatibilities between hardware components 108, operating and applications software 109, and target devices 104. These can result in inoperative features or substandard performance. However, as previously noted, in at least certain embodiments a given target device 104 can have limited capability for self-diagnosis or evaluation. Thus, a user of target device 104, such as a developer, may perceive the lack of desired performance but have limited ability to diagnose and address substandard performance directly on target device 104.

In one embodiment, system 100 can include file system transfer and synchronization indicated by designator 150. File system transfer and synchronization 150 can facilitate communication of the contents and data structure of file system 140 from target device 104 to host device 102. File system transfer and synchronization 150 can occur via one or more of communication links 106, 121, 122, 126, and 130 as previously described with respect to FIGS. 1 and 2. File system transfer and synchronization 150 can also provide for synchronization of data between host device 102 and target device 104 such that a substantially identical copy or clone of file system 140 from target device 104 can be created at host device 102.

Embodiments of such file system copies or clones are illustrated in FIG. 3 by designators 140a, 140b, 140c, and 140n. File system clones 140 can also be designated with labels V.0, V.1, V.2 and V.n. The plurality of file system clones 140 at host device 102 can correspond to file systems 140 arising from different operational iterations of target device 104. In one embodiment, different file system clones 140 at host device 102 can correspond to multiple operational iterations of the same target device 104 operating under the same configuration of hardware components 108 and operating and applications software 109. This embodiment facilitates development of enhancements to target device 104 where file system 140 resulting from an operational iteration of target device 104 can vary from iteration to iteration even if target device 104 and associated hardware components 108 and operating and applications software 109 are not actively modified between iterations.

In another embodiment, a plurality of file system clones 140 at host device 102 can correspond to multiple operational iterations of the same target device 104 but with a different configuration of hardware components 108 and/or operating and applications software 109. For example, in this embodiment a developer may perform an operational iteration of target device 104 under a first configuration and a corresponding first file system clone can be generated at host device 102. A developer can then modify one or both of hardware components 108 and operating and applications software 109 and perform a second operational iteration or run of target device 104 under the second configuration. A resulting second file system clone 140b can then be created at host device 102. A developer can then compare between first and second file system clones 140a, 140b to evaluate the effects of the modification of target device 104.

In yet a further embodiment, multiple file system clones 140 at host device 102 can correspond to operational iterations of different target devices 104. For example, in one embodiment, a developer may provide the same or different combinations or configurations of hardware components 108 and operating and applications software 109 to multiple target devices 104. Multiple target devices 104 can be of the same or different designs. One or multiple operational iterations of the plurality of target devices 104 can be run with the same or modified configurations of one or both of hardware components 108 and operating and applications software 109 of one or more of target devices 104. Thus, it will be understood that various embodiments provide a wide variety of possibilities for evaluating various combinations of hardware components 108 and operating and applications software 109 on one or multiple target devices 104 that may have the same or different types.

As previously noted, in at least some embodiments host device 102 has in at least some aspects greater performance and/or capacity than target devices 104 that can be associated with host device 102 for file system transfer and synchronization 150. By using host device 102 having greater capacity and/or performance, a developer can more effectively evaluate performance of target device 104 by evaluating, comparing, and/or tracking the plurality of file system clones 140a, 140b, 140c, 140n. In embodiments including IDE 114, a developer can be further provided with powerful software development tools to assist in improving the performance of target device 104. Again, as previously noted, in at least some embodiments, target devices 104 may lack the processor performance and/or storage and memory capacity to effectively use an IDE 114 directly on target device 104.

Figure 4:
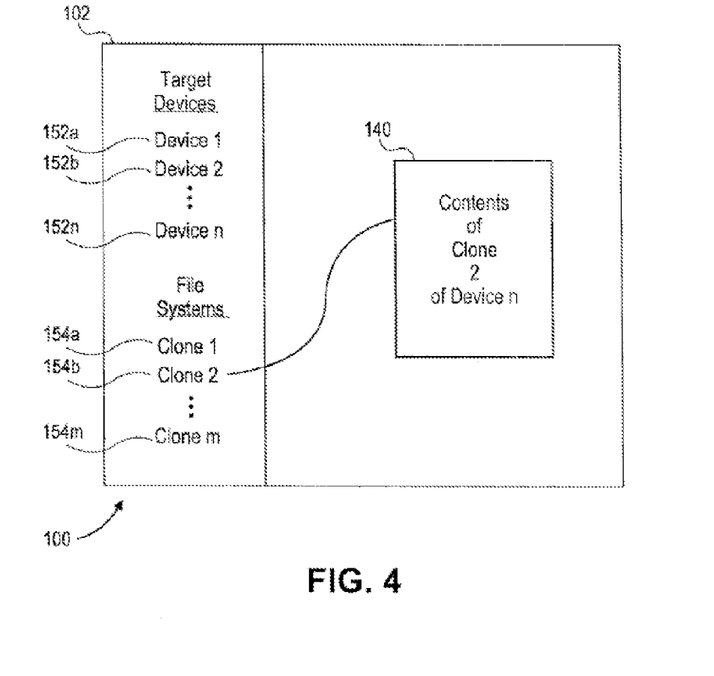
FIG. 4 is a block diagram of embodiments of a system for file cloning between a target device and a host device illustrating embodiments of presenting file cloned data at a host device.

FIG. 4 illustrates embodiments of presentation of file system clone 140 data via host device 102. As previously noted, in at least some embodiments host device 102 can include a display capability and FIG. 4 illustrates schematically a graphical or visual depiction of file system clones 140.

In one embodiment, host device 102 displays one or more target device pointers or bookmarks 152a, 152b, 152n. Bookmarks or pointers 152 can each correspond to file system clones 140 that have been created and stored at host device 102. Selection or activation of bookmark or pointer 152 corresponding to desired target device 104 can retrieve associated file system clone(s) 140 associated with that target device 104.

As previously noted, for any given target device 104, host device 102 may have one or a plurality of associated file system clones 140. FIG. 4 further indicates bookmarks or pointers 154 associated with file system clones 140 for a given target device 104. Thus, a user may select desired bookmark or pointer 152 for desired device 104 and corresponding bookmark or pointer 154 for the desired file system clone 140 of that device. For example, FIG. 4 illustrates user selection of device n and file system clone 2 of that device. As previously noted, the particular contents and data structure of file system clone 140 can vary depending on the particular application and does not limit the scope of the invention.

Figure 5:
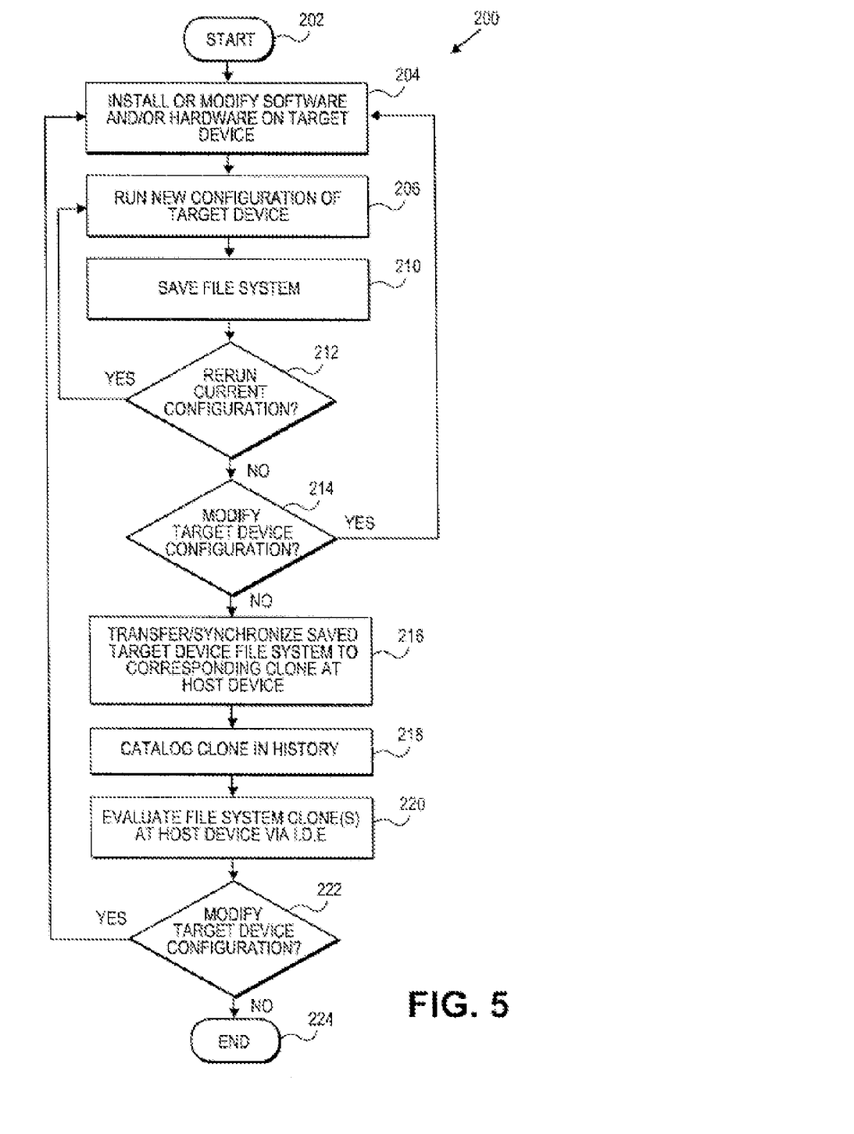
FIG. 5 illustrates embodiments of a method or work flow of file cloning between a target device and a host device.

FIG. 5 is a flow chart of embodiments of a method or work flow 200 for file system cloning between host device 102 and target device 104. Embodiments of the method or work flow 200 can be advantageously employed with embodiments of system 100 previously described. Method or work flow 200 begins in start block 202. Start block 202 generally can include procuring an appropriate host device 102 and at least one target device 104 and establishing communication therebetween.

In block 204, appropriate software and/or hardware can be installed or modified on at least one target device 104. Following in block 206, an operational iteration or run of the new configuration of target device 104 can be performed. In block 210, file system 140 and/or files or documents 142 resulting from block 206 can be saved in block 210.

In block 212, a decision can be made whether to rerun or perform a further operational iteration of the target device under the current configuration. If the result of block 212 is affirmative, method or work flow 200 returns to a further iteration of blocks 206 and 210. If the result of block 212 is negative, method or work flow proceeds to block 214.

In block 214, a decision can be made whether to modify the target device configuration. If the result of block 214 is affirmative, method or work flow 200 returns for a further iteration of blocks 204, 206, 210, and 212.

If the result of block 214 is negative, the saved target device file system(s) from one or more iterations of block 210 can be transferred or synchronized as corresponding clones at the host device in block 216. Following in block 218, the file system clone(s) can be cataloged in a history. In some embodiments, IDE 114 can support creation of an organized or cataloged historical record of multiple runs and the corresponding file system clones in block 218. In one embodiment, IDE 114 keeps a cataloged history of multiple runs of a given application or project for a given target device 104. Historical context can be useful to developers of the application or project.

Following in block 220, one or more file system clones can be evaluated at the host device. In certain preferred embodiments, evaluation of file system clones can be facilitated by use of IDE 114. Block 220 can include comparing the content of clones from different runs on the same target device 104. Block 220 can include comparing the content of clones from different runs on different target devices 104. Block 220 can include parsing multiple clones and evaluating consistency between the multiple clones.

Following in block 222, a decision can be made whether the configuration of the target device should be modified. If the result of block 222 is affirmative, work flow or method 200 returns for further iterations of blocks 204, 206, 210, 212, 214, 216, 220, and 222. If the result of block 222 is negative, work flow or method 200 ends in block 224.

Thus, various embodiments of system 100 and method 200 can provide enhanced tools and capabilities to allow a developer to more efficiently and conveniently evaluate and develop hardware and/or software enhancements for one or more target devices 104. A given target device 104 can be located locally or remotely with respect to host device 102, in either case allowing full use of the advantages of the various embodiments described. A user of target device 104 can go to a point of sale and service and connect their target device 104 either directly or wirelessly with an interface hub/dock 124. A developer, who can be local or remote with respect to the user of target device 104, can utilize embodiments of system and method 100 and 200 to evaluate the performance of target device 104 by accessing stored file systems 140. In at least some embodiments, the developer can evaluate the performance of target device 104 via consideration of file system clones and provide a modified configuration to target device 104 to improve the performance thereof in a timely efficient manner and improve customer satisfaction with their target device 104.

Figure 6A:
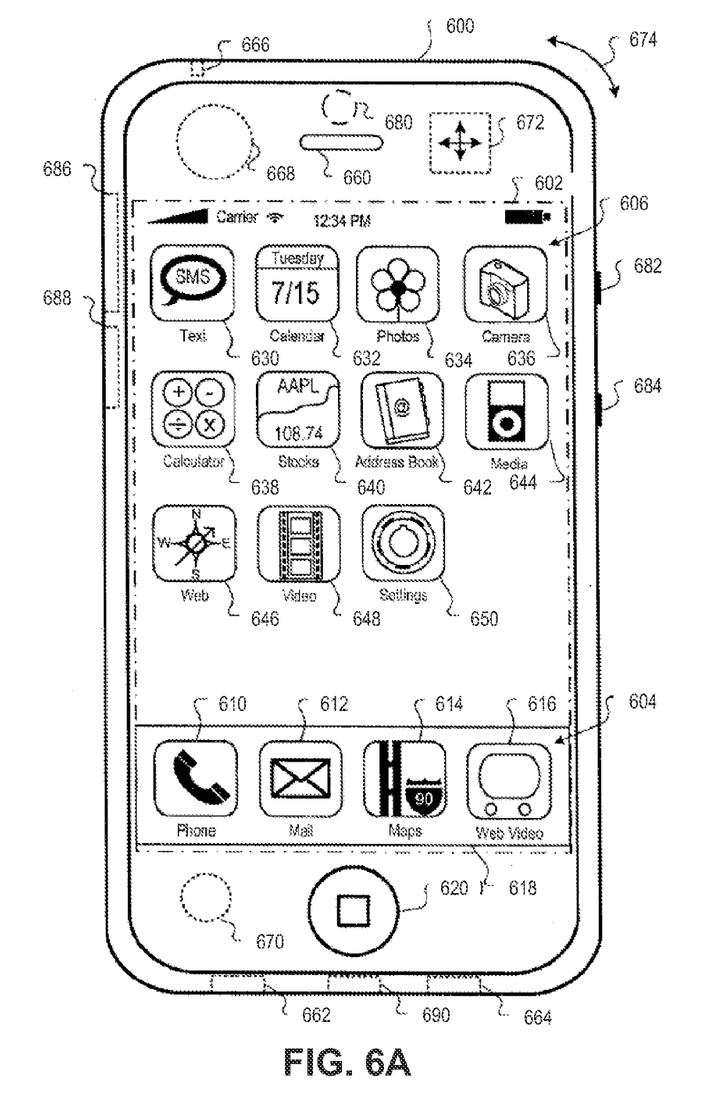
FIG. 6A illustrates an example embodiment of a mobile device.

FIG. 6A illustrates an example mobile device 600. The mobile device 600 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 600 includes a touch-sensitive display 602. The touch-sensitive display 602 can be implemented with liquid crystal display (LCD) technology, light emitting polymer display (LPD) technology, or some other display technology. The touch-sensitive display 602 can be sensitive to haptic and/or tactile contact with a user.

In some implementations, the touch-sensitive display 602 can include a multi-touch-sensitive display 602. A multi-touch-sensitive display 602 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 600 can display one or more graphical user interfaces on the touch-sensitive display 602 for providing the user access to various system objects and for conveying information to the user. In some implementations, the graphical user interface can include one or more display objects 604, 606. In the example shown, the display objects 604, 606, are graphic representations of system objects. Some examples of system objects include device functions, applications, windows, files, alerts, events, or other identifiable system objects.

Example Mobile Device Functionality

In some implementations, the mobile device 600 can implement multiple device functionalities, such as a telephony device, as indicated by a Phone object 610; an e-mail device, as indicated by the Mail object 612; a map devices, as indicated by the Maps object 614; a Wi-Fi base station device (not shown); and a network video transmission and display device, as indicated by the Web Video object 616. In some implementations, particular display objects 604, e.g., the Phone object 610, the Mail object 612, the Maps object 614, and the Web Video object 616, can be displayed in a menu bar 618. In some implementations, device functionalities can be accessed from a top-level graphical user interface, such as the graphical user interface illustrated in FIG. 6A. Touching one of the objects 610, 612, 614, or 616 can, for example, invoke a corresponding functionality.

In some implementations, the mobile device 600 can implement a network distribution functionality. For example, the functionality can enable the user to take the mobile device 600 and provide access to its associated network while traveling. In particular, the mobile device 600 can extend Internet access (e.g., Wi-Fi) to other wireless devices in the vicinity. For example, mobile device 600 can be configured as a base station for one or more devices. As such, mobile device 600 can grant or deny network access to other wireless devices.

In some implementations, upon invocation of a device functionality, the graphical user interface of the mobile device 600 changes, or is augmented or replaced with another user interface or user interface elements, to facilitate user access to particular functions associated with the corresponding device functionality. For example, in response to a user touching the Phone object 610, the graphical user interface of the touch-sensitive display 602 may present display objects related to various phone functions; likewise, touching of the Mail object 612 may cause the graphical user interface to present display objects related to various e-mail functions; touching the Maps object 614 may cause the graphical user interface to present display objects related to various maps functions; and touching the Web Video object 616 may cause the graphical user interface to present display objects related to various web video functions.

In some implementations, the top-level graphical user interface environment or state of FIG. 6A can be restored by pressing a button 620 located near the bottom of the mobile device 600. In some implementations, each corresponding device functionality may have corresponding "home" display objects displayed on the touch-sensitive display 602, and the graphical user interface environment of FIG. 6A can be restored by pressing the "home" display object.

In some implementations, the top-level graphical user interface can include additional display objects 606, such as a short messaging service (SMS) object 630, a Calendar object 632, a Photos object 634, a Camera object 636, a Calculator object 638, a Stocks object 640, a Address Book object 642, a Media object 644, a Web object 646, a Video object 648, a Settings object 650, and a Notes object (not shown). Touching the SMS display object 630 can, for example, invoke an SMS messaging environment and supporting functionality; likewise, each selection of a display object 632, 634, 636, 638, 640, 642, 644, 646, 648, and 650 can invoke a corresponding object environment and functionality.

Additional and/or different display objects can also be displayed in the graphical user interface of FIG. 6A. For example, if the device 600 is functioning as a base station for other devices, one or more "connection" objects may appear in the graphical user interface to indicate the connection. In some implementations, the display objects 606 can be configured by a user, e.g., a user may specify which display objects 606 are displayed, and/or may download additional applications or other software that provides other functionalities and corresponding display objects.

In some implementations, the mobile device 600 can include one or more input/output (I/O) devices and/or sensor devices. For example, a speaker 660 and a microphone 662 can be included to facilitate voice-enabled functionalities, such as phone and voice mail functions. In some implementations, an up/down button 684 for volume control of the speaker 660 and the microphone 662 can be included. The mobile device 600 can also include an on/off button 682 for a ring indicator of incoming phone calls. In some implementations, a loud speaker 664 can be included to facilitate hands-free voice functionalities, such as speaker phone functions. An audio jack 666 can also be included for use of headphones and/or a microphone.

In some implementations, a proximity sensor 668 can be included to facilitate the detection of the user positioning the mobile device 600 proximate to the user's ear and, in response, to disengage the touch-sensitive display 602 to prevent accidental function invocations. In some implementations, the touch-sensitive display 602 can be turned off to conserve additional power when the mobile device 600 is proximate to the user's ear.

Other sensors can also be used. For example, in some implementations, an ambient light sensor 670 can be utilized to facilitate adjusting the brightness of the touch-sensitive display 602. In some implementations, an accelerometer 672 can be utilized to detect movement of the mobile device 600, as indicated by the directional arrow 674. Accordingly, display objects and/or media can be presented according to a detected orientation, e.g., portrait or landscape. In some implementations, the mobile device 600 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 600 or provided as a separate device that can be coupled to the mobile device 600 through an interface (e.g., port device 690) to provide access to location-based services.

In some implementations, a port device 690, e.g., a Universal Serial Bus (USB) port, or a docking port, or some other wired port connection, can be included. The port device 690 can, for example, be utilized to establish a wired connection to other computing devices, such as other communication devices 600, network access devices, a personal computer, a printer, a display screen, or other processing devices capable of receiving and/or transmitting data. In some implementations, the port device 690 allows the mobile device 600 to synchronize with a host device using one or more protocols, such as, for example, the TCP/IP, HTTP, UDP and any other known protocol.

The mobile device 600 can also include a camera lens and sensor 680. In some implementations, the camera lens and sensor 680 can be located on the back surface of the mobile device 600. The camera can capture still images and/or video.

The mobile device 600 can also include one or more wireless communication subsystems, such as an 802.11 b/g communication device 686, and/or a Bluetooth™ communication device 688. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Configurable Top-Level Graphical User Interface

Figure 6B:
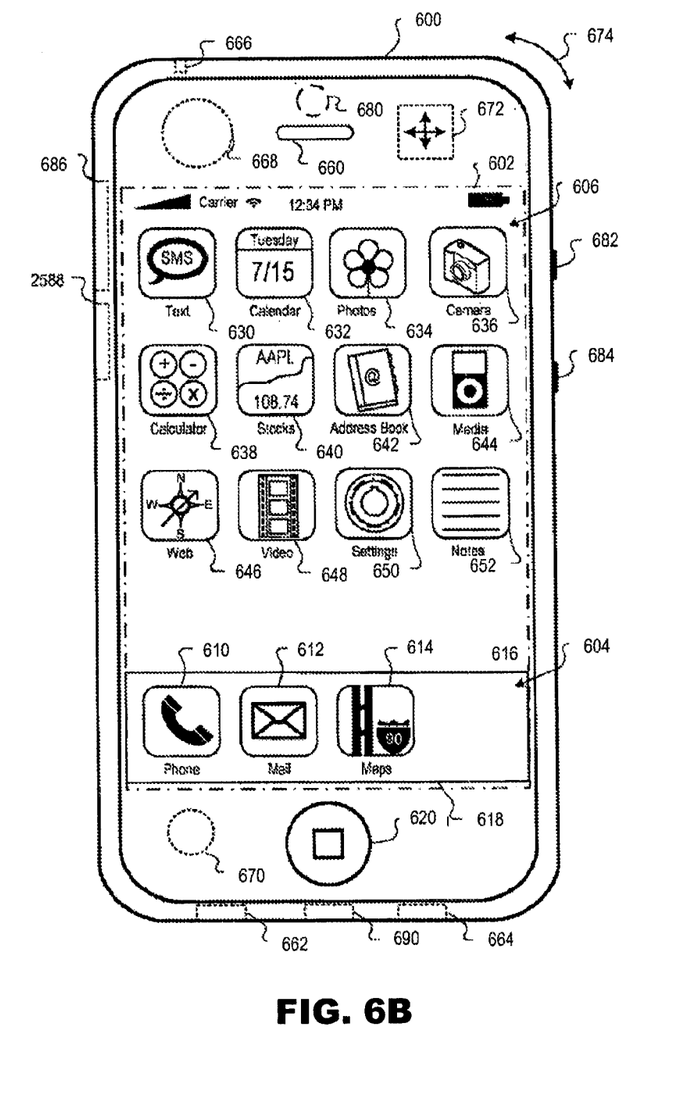
FIG. 6B illustrates an example embodiment of a configurable top-level graphical user interface of a mobile device.

FIG. 6B illustrates another example of configurable top-level graphical user interface of device 600. The device 600 can be configured to display a different set of display objects.

In some implementations, each of one or more system objects of device 600 has a set of system object attributes associated with it; and one of the attributes determines whether a display object for the system object will be rendered in the top-level graphical user interface. This attribute can be set by the system automatically, or by a user through certain programs or system functionalities as described below. FIG. 6B shows an example of how the Notes object 652 (not shown in FIG. 6A) is added to and the Web Video object 616 is removed from the top graphical user interface of device 600 (e.g. such as when the attributes of the Notes system object and the Web Video system object are modified).

Example Mobile Device Architecture

Figure 7:
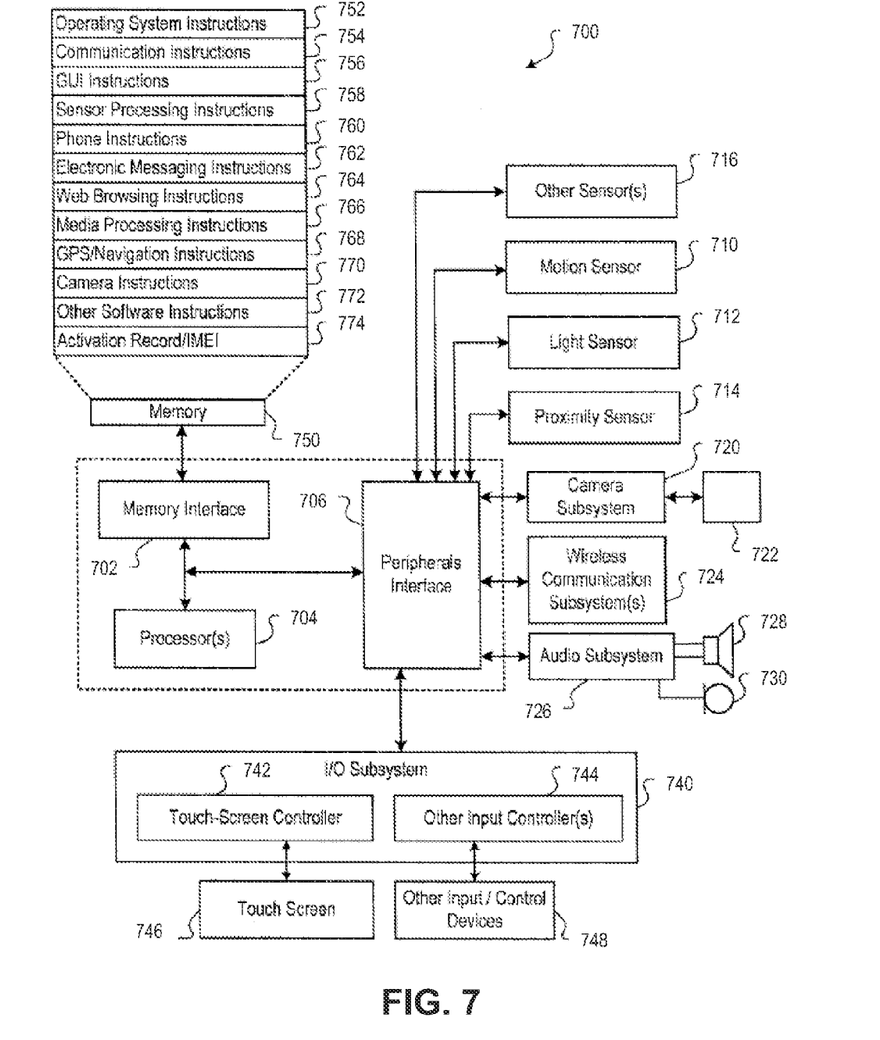
FIG. 7 is a block diagram of an example implementation of a mobile device.

FIG. 7 is a block diagram 700 of an example implementation of a mobile device (e.g., mobile device 600). The mobile device can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate the orientation, lighting, and proximity functions described with respect to FIG. 6A. Other sensors 716 can also be connected to the peripherals interface 706, such as a positioning system (e.g., GPS receiver), a temperature sensor, a biometric sensor, or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the mobile device is intended to operate. For example, a mobile device can include communication subsystems 724 designed to operate over a GSM network, a GPRS network, an EDGE network, a Wi-Fi or WiMax network, and a Bluetooth™ network. In particular, the wireless communication subsystems 724 may include hosting protocols such that the mobile device may be configured as a base station for other wireless devices.

An audio subsystem 726 can be coupled to a speaker 728 and a microphone 730 to facilitate voice-enabled functions, such as voice recognition, voice replication, digital recording, and telephony functions.

The I/O subsystem 740 can include a touch screen controller 742 and/or other input controller(s) 744. The touch-screen controller 742 can be coupled to a touch screen 746. The touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration may disengage a lock of the touch screen 746; and a pressing of the button for a second duration that is longer than the first duration may turn power to the mobile device on or off. The user may be able to customize a functionality of one or more of the buttons. The touch screen 746 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks. The operating system 752 may include instructions for handling basic system services and for performing hardware dependent tasks. In some implementations, the operating system 752 can be a kernel (e.g., UNIX kernel).

The memory 750 may also store communication instructions 754 to facilitate communicating with one or more additional devices, one or more computers and/or one or more servers. The memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; and/or other software instructions 772 to facilitate other processes and functions. The memory 750 may also store other software instructions (not shown), such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) 774 or similar hardware identifier can also be stored in memory 750.

Although the above-disclosed embodiments of the present invention have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

What is claimed is:

1. A computer-implemented method comprising:
    causing, by an integrated development environment, an application configuration to be installed on a mobile electronic device through a connection between the mobile electronic device and a host electronic device, the integrated development environment executing on the host electronic device for use by a developer to develop applications, the application configuration selected by the developer from a plurality of configurations for testing an application;
    creating, in a memory on the host electronic device, a clone of a portion of a file system on the mobile electronic device during a connection between the mobile electronic device and the host electronic device, the file system including all files and data created by running the application configuration on the mobile electronic device, wherein creating the clone comprises:
        detecting the connection between the mobile electronic device and the host electronic device;
        transferring the clone of the portion of the file system to the host electronic device; and
        cataloging, by the host electronic device, the clone of the portion of the file system with previously cataloged clones of portions of file systems generated by testing the application on the mobile electronic device using different configurations of the plurality of configurations;
    accessing, by the integrated development environment, the cataloged clones for the different configurations on the host electronic device; and
    evaluating, by the integrated development environment, operation of the application under the different configurations by comparing the portions of the file systems in the cataloged clones.

2. The computer-implemented method of claim 1 further comprising generating a graphical display corresponding to contents of the file system.

3. An apparatus having a processor coupled to a memory comprising:
    means for causing an application configuration to be installed on a mobile electronic device by an integrated development environment through a connection between the mobile electronic device and a host electronic device, the integrated development environment executing on the host electronic device for use by a developer to develop applications, the application configuration selected by the developer from a plurality of configurations for testing an application;
    means for creating a clone of a portion of the file system on the mobile electronic device in a memory on the host electronic device during a connection between the mobile electronic device and the host electronic device, the file system including all files and data created by running the application configuration on the mobile electronic device, wherein the means for creating the clone comprises:
        means for detecting the connection between the mobile electronic device and the host electronic device;
        means for transferring the clone of the portion of the file system to the host electronic device; and
        means for cataloging, by the host electronic device, the clone of the portion of the file system with previously cataloged clones of portions of file systems generated by testing the application on the mobile electronic device using different configurations of the plurality of configurations;
            means for accessing the cataloged clones for the different configurations on the host electronic device; and
    means for evaluating operation of the application under the different configurations by the integrated development environment by comparing the portions of the file systems in the cataloged clones.

4. The apparatus of claim 3 further comprising means for generating a graphical display corresponding to contents of the file system.

5. An article of manufacture comprising a non-transitory computer-readable medium having stored thereon instructions that, when executed, cause one or more processors to:
    cause, by an integrated development environment, an application configuration to be installed on a mobile electronic device through a connection between the mobile electronic device and a host electronic device, the integrated development environment executing on the host electronic device for use by a developer to develop applications, the application configuration selected by the developer from a plurality of configurations for testing an application;
    request a clone of a portion of the file system for the application configuration corresponding to an execution on the mobile electronic device through the integrated development environment during a connection between the mobile electronic device and the host electronic device, the file system including all files and data created by running the application configuration on the mobile electronic device, the clone of the portion stored in a memory on the host electronic device, wherein requesting the clone causes the one or more host processors to:
        detect the connection between the mobile electronic device and the host electronic device;
        transfer the clone of the portion of the file system to the host electronic device; and
        catalog, by the host electronic device, the clone of the portion of the file system with previously cataloged clones of portions of file systems generated by testing the application on the mobile electronic device using different configurations of the plurality of configurations;
    access, by the integrated development environment, the cataloged clones for the different configurations on the host electronic device; and
    evaluate, by the integrated development environment, operation of the application under the different configurations by comparing the portions of the file systems in the cataloged clones.

6. The article of manufacture of claim 5 further comprising instructions that, when executed, cause the one or more processors to generate a graphical display corresponding to contents of the file system.

7. The article of manufacture of claim 5 further comprising instructions that, when executed, cause one or more processors on the mobile electric device to:
- receive the application configuration to be installed on the mobile electronic device from the integrated development environment;
- install the application configuration on the mobile electronic device;
- run the application configuration on the mobile electronic device;
- create the clone on the mobile electronic device; and
- transmit the clone of the portion of the file system to the host electronic device during the connection between the mobile electronic device and the host electronic device.

\* \* \* \* \*